(12) United States Patent
Kim

(10) Patent No.: US 11,612,961 B2
(45) Date of Patent: Mar. 28, 2023

(54) PROCESSING DEVICE FOR FORMING PATTERN ON SURFACE OF MATERIAL BY USING DIFFRACTION OF LASER BEAM, AND METHOD THEREOF

(71) Applicant: Chan Sam Kim, Seoul (KR)

(72) Inventor: Chan Sam Kim, Seoul (KR)

( * ) Notice: Subject to any disclaimer, the term of this patent is extended or adjusted under 35 U.S.C. 154(b) by 298 days.

(21) Appl. No.: 16/957,595

(22) PCT Filed: Jan. 23, 2018

(86) PCT No.: PCT/KR2018/000973
§ 371 (c)(1),
(2) Date: Oct. 30, 2020

(87) PCT Pub. No.: WO2019/132099
PCT Pub. Date: Jul. 4, 2019

(65) Prior Publication Data
US 2021/0053156 A1    Feb. 25, 2021

(30) Foreign Application Priority Data
Dec. 26, 2017  (KR) .......... 10-2017-0179602

(51) Int. Cl.
*B23K 26/064*    (2014.01)
*B23K 26/08*     (2014.01)
(Continued)

(52) U.S. Cl.
CPC .......... *B23K 26/359* (2015.10); *B23K 26/064* (2015.10); *B23K 26/0876* (2013.01); *B23K 26/0648* (2013.01); *B23K 26/0665* (2013.01)

(58) Field of Classification Search
CPC ............... B23K 26/40; B23K 26/0853; B23K 2103/50; B23K 2101/40; B23K 26/364;
(Continued)

(56) References Cited

U.S. PATENT DOCUMENTS 7,737,002 B2 * 6/2010 Yoshikawa ............ B23K 26/40
438/460
2006/0119691 A1 * 6/2006 Shigematsu ...... H01L 21/67253
347/131
(Continued)

FOREIGN PATENT DOCUMENTS

JP       2008-526511 A    7/2008
KR   10-2008-0067748 A    7/2008
(Continued)

*Primary Examiner* — Chris Q Liu
(74) *Attorney, Agent, or Firm* — Hoffmann & Baron, LLP

(57) ABSTRACT

A processing device to form a pattern on a surface of an object to be processed using diffraction of a laser beam emitted from a laser source, the device including: a main body providing a space to process the object using the laser beam emitted from the laser source; a laser transmission unit formed at a first portion of the main body, and configured to diffract the laser beam so that a diffracted laser beam is emitted toward the object; an actuator formed at a second portion of the main body, and connected to the laser transmission unit so as to change an emission pattern of the diffracted laser beam while rotating the laser transmission unit vertically/horizontally or in a set radius; and a controller provided at a third portion of the main body, and connected to the actuator to control an operation of the actuator.

11 Claims, 12 Drawing Sheets

(51) Int. Cl.
*B23K 26/06* (2014.01)
*B23K 26/359* (2014.01)

(58) Field of Classification Search
CPC .............. B23K 26/082; B23K 26/032; B23K 26/0622; B23K 26/38; B23K 26/046; B23K 26/0648; B23K 26/067; B23K 26/0676; B23K 2103/172; B23K 26/03; B23K 26/0736; B23K 26/382; B23K 26/042; B23K 26/0613; B23K 26/0869; B23K 26/0876; B23K 26/0626; B23K 26/064; B23K 26/389; B23K 26/0652; B23K 26/0673; B23K 26/0884; B23K 26/359; B23K 26/53; B23K 2103/56; B23K 26/02; B23K 26/034; B23K 26/04; B23K 26/048; B23K 26/0604; B23K 26/0643; B23K 26/0665; B23K 26/073; B23K 26/0732; B23K 26/352; B23K 26/355; B23K 26/361; B23K 26/402; B23K 26/702; B23K 26/0006; B23K 26/06; B23K 26/0624; B23K 26/08; B23K 26/083; B23K 26/16; B23K 26/21; B23K 26/32; B23K 26/36; B23K 26/362; B23K 26/384; B23K 26/50; B23K 26/70; B23K 26/705; B23K 2101/001; B23K 2101/34; B23K 2103/08; B23K 2103/10; B23K 2103/12; B23K 2103/14; B23K 2103/16; B23K 2103/18; B23K 2103/26; B23K 2103/52; B23K 26/0608; B23K 26/066; B23K 26/0734; B23K 26/0738; B23K 26/0823; B23K 26/0838; B23K 26/103; B23K 26/244; B23K 26/34; B23K 26/342; B23K 26/351; B23K 26/356; B23K 26/3584; B23K 26/386; B23K 26/388; B23K 26/60; B23K 37/0211; B23K 37/0235; B23K 37/0408; B23K 37/0435
USPC ............ 219/121.67, 121.82, 121.61, 121.73, 219/121.83, 121.62, 121.68, 121.72, 219/121.78, 121.85, 121.6, 121.64, 121.7, 219/121.75, 121.77, 121.8, 121.81, 219/121.63, 121.69, 121.71, 121.74, 219/121.76, 121.79, 76.14
See application file for complete search history.

(56) References Cited

U.S. PATENT DOCUMENTS

| | | | |
|---|---|---|---|
| 2006/0205183 | A1* | 9/2006 | Morikazu ............ B28D 5/0011 257/E21.599 |
| 2007/0109526 | A1* | 5/2007 | Morikazu ............ B23K 26/382 355/99 |
| 2007/0268794 | A1 | 11/2007 | Hill |
| 2015/0321284 | A1* | 11/2015 | Nakamura ............ B23K 26/083 219/121.82 |

FOREIGN PATENT DOCUMENTS

| | | |
|---|---|---|
| KR | 10-2012-0055893 A | 6/2012 |
| KR | 10-2015-0008318 A | 1/2015 |
| KR | 10-2016-0061671 A | 6/2016 |

* cited by examiner

PROCESSING DEVICE FOR FORMING PATTERN ON SURFACE OF MATERIAL BY USING DIFFRACTION OF LASER BEAM, AND METHOD THEREOF

CROSS-REFERENCE TO RELATED APPLICATIONS

This application is the U.S. National Phase of International Patent Application No. PCT/KR2018/000973, filed on 23 Jan. 2018, which claims benefit of Korean Patent Application No. 10-2017-0179602, filed on 26 Dec. 2017, the contents of which are incorporated herein by reference in their entirety.

BACKGROUND

Technical Field

The present disclosure is related to a processing device and method for forming a pattern on the surface of a material by using diffraction of a laser beam, wherein the laser beam is emitted to an object to be laser-processed uniformly through diffraction of the laser beam and processing proceeds with changing an emission pattern of the laser beam.

Related Art

Conventional processing techniques for forming a groove on a surface of a metal include a method for scratching the surface of an object to be processed using an abrasive and if obstinately insisting on using the laser, a method for emitting a laser beam from a laser beam source to the surface of the object using an optical system.

The method for pattern processing the surface of a metal using an abrasive has been widely used in the field of industry due to various sizes of crystals of the abrasive, but has a drawback, that is, a lack of uniformity in patterns caused by crystals that come off the abrasive when forming patterns using the abrasive, resulting from potential existence of pores according to the quality of the abrasive itself and irregularity within a crystal structure.

A conventional laser processing device using a common optical system or scanner (e.g., laser engraving) shows a stable processing quality and precision of a laser beam and also has an advantage capable of processing various patterns, thus being used in the field of various industries from processing a small component to processing complicated patterns.

However, it is allowable to process a pattern only on a portion of the surface of an object to be processed that is exposed to the beam, in such a fashion. That is, if a pattern to be processed is complicated or an area to be processed is large, it takes a lot of time, thus decreasing working efficiency.

Further, according to the conventional technique, an abrasive is used in order to form a pattern on the surface of a steel. However, it is not allowable to acknowledge the exchange cycle and exchange timing of the abrasive resulting from abrasion thereof, and to form any patterns meeting the demand of a market.

RELATED ART DOCUMENT

Patent Document

Korean Patent Registration No. 10-0313703 (Title of invention: A Method of Hard-Surface Lapping by Focused Laser Beam).

SUMMARY

Technical Problem

Therefore, the present disclosure aims to provide a processing device and method for forming a pattern on a surface of a material by using diffraction of a laser beam, which processes the surface of the material to be processed simultaneously with beams diffracted uniformly by diffracting the laser beam.

Further, the present disclosure aims to provide a processing device and method for forming a pattern on the surface of a material using diffraction of a laser beam, which implements various processing patterns by converting a laser in vertical, horizontal, forward, and backward directions.

Meanwhile, technical objects to be achieved in the present disclosure are not limited to the aforementioned technical objects, and other technical objects, which are not mentioned above, will be apparently understood to a person having ordinary skill in the art from the following description.

Technical Solution

In order to improve the aforementioned drawbacks of the prior art, according to a first aspect of the present disclosure, a processing device to form a pattern on a surface of an object to be processed using diffraction of a laser beam emitted from a laser source is disclosed. The processing device may include: a device main body providing a space to process the object by using the laser beam emitted from the laser source; a laser transmission unit that is formed at a first portion of the device main body, and configured to diffract the laser beam emitted from the laser source so that a diffracted laser beam is emitted toward the object to be processed while accommodating the laser beam emitted from the laser source; an actuator that is formed at a second portion of the device main body and connected to the laser transmission unit so as to change an emission pattern of the diffracted laser beam while rotating the laser transmission unit vertically/horizontally or in a set radius; and a controller that is installed at a third portion of the device main body and connected to the actuator so as to control an operation of the actuator.

According to another aspect of the present disclosure, the laser transmission unit may include: at least one diffraction optical system that diffracts the laser beam emitted from the laser source; at least one array in which a plurality of receiving grooves is formed linearly to accommodate the at least one diffraction optical system; and an array fixture having an upper part and a lower part, wherein the upper part is fixed with the at least one array and the lower part is connected to the actuator.

According to another aspect of the present disclosure, the diffraction optical system may include: a beam splitter configured to reflect a part of the laser beam emitted from the laser source and to transmit a remaining part of the laser beam emitted from the laser source; and a focusing lens configured to control diffraction of the diffracted laser beam by adjusting focus while passing through the remaining part of the laser beam transmitted from the beam splitter.

According to another aspect of the present disclosure, a plurality of diffraction optical systems and a plurality of arrays may be provided, wherein the diffraction optical systems may be installed in the arrays to cross each other in a zigzag pattern forming a pair.

According to another aspect of the present disclosure, the actuator may include: a linear movement member that is connected to a lower part of the laser transmission unit so as to move the laser transmission unit forward and backward in a linear direction; a rotation member that is combined with a lower part of the linear movement member so as to rotate the linear movement member vertically at a set angle; and an elevation member that is combined with opposite ends of the rotation member, respectively so as to raise and lower the rotation member upwardly and downwardly.

According to another aspect of the present disclosure, the linear movement member may include: a linear guide that is combined with a lower part of the laser transmission unit so as to guide the linear movement of the laser transmission unit; a ball screw that is connected to the linear guide and the laser transmission unit so as to reciprocally move the laser transmission unit forward and backward on the linear guide; a roller block that is connected to the ball screw and the laser transmission unit, the roller block movably combined with a rail formed on the linear guide; and a linear fixture in which the linear guide and the linear ball screw are installed, the rotation member is combined to a lower part thereof and a through hole is formed through which the laser beam of the laser transmission unit passes.

According to another aspect of the present disclosure, the ball screw may include: a male screw of which one end is fixed to the linear fixture and in which a male screw thread is formed; a female screw that is provided with balls corresponding to the male screw thread formed in the male screw, wherein the female screw is connected to the roller block, combined with the male screw, and configured to move the male screw forward and backward; and a ball screw driver that is connected with another end of the male screw and configured to provide the male screw with a rotation force.

According to another aspect of the present disclosure, the rotation member may include: an arc-shaped rotation guide that is installed at opposite ends of a lower part of the linear movement member, respectively so as to guide rotation of the linear movement member; a rotation gear having a shape corresponding to the rotation guide, and movably combined with a rail formed on the rotation guide while being connected to a lower part of the linear movement member, so as to allow the rotation of the linear movement member; a gearbox that is connected to the rotation gear so as to provide power allowing the movement of the rotation gear; and a rotation guide fixture in which the arc-shaped rotation guide, the rotation gear, and the gearbox are installed in an upper part thereof, wherein the elevation member is combined to a lower part thereof, and a through hole is formed through which the laser beam of the laser transmission unit passes.

According to another aspect of the present disclosure, the elevation member may include: at least one elevation roller that is installed to a part of a lower part of the rotation member, and that is installed into a shape that a bottom end thereof is inclined; an elevation block in which a rail is formed into a state that an upper part thereof is inclined in response to the elevation roller, and the elevation roller is movably connected thereto; at least one elevation block guide in which a rail is formed so as to combine a lower part of the elevation block allowing a linear movement thereof; an elevation block driver that is connected to the elevation block and configured to provide power allowing movement of the elevation block along the elevation block guide; and an elevation block guide fixture in which the elevation block guide and the elevation block driver are installed and a roller is provided so as to allow transmission to the object to be processed.

According to another aspect of the present disclosure, the elevation block driver may be a ball screw type or a linear motor driving type, and when the elevation block driver is the ball screw type, the elevation block driver includes a male screw of which one end is fixed to the elevation block guide fixture and on which a male screw thread is formed, a female screw that has balls corresponding to the male screw thread formed in the male screw, wherein the female screw is connected to the elevation block, combined with the male screw, and configured to move the male screw forward and backward, and a ball screw driver that is connected to another end of the male screw, thus providing power allowing movement of the elevation block.

According to another aspect of the present disclosure, a through hole through which the laser beam of the laser transmission unit passes may be formed on the elevation block guide fixture, and a longitudinal one end of the elevation block guide fixture may be connected detachably to a part of an upper part of a transfer rail by which the object to be processed is transferred.

According to another aspect of the present disclosure, the processing device to form the pattern on the surface of the object to be processed using the laser beam emitted from the laser source may further include a transmission unit guide that is connected to the laser transmission unit and installed along a longitudinal direction of a roller in an upper part of the roller, the transmission unit guide allowing emission of the diffracted laser beam to the longitudinal direction of the roller and guiding linear movement of the laser transmission unit.

According to a second aspect of the present disclosure, the processing device may include the laser transmission unit including at least one diffraction optical system that diffracts the laser beam emitted from the laser source, at least one array in which a plurality of receiving grooves is formed linearly to accommodate the at least one diffraction optical system, and an array fixture having an upper part and a lower part, wherein the upper part is fixed with the at least one array and the lower part is connected to the actuator. A processing method for forming a pattern on a surface of an object to be processed using diffraction of a laser beam emitted from a laser source with the processing device may include the following steps: diffracting the laser beam emitted from the laser source so that a diffracted laser beam is emitted toward the object to be processed, wherein a beam splitter reflects a part of the laser beam emitted from the laser source and transmits a remaining part of the laser beam emitted from the laser source, and a focusing lens controlled by the diffraction optical system controls diffraction of the diffracted laser beam by adjusting a focus while passing through the remaining part of the laser beam transmitted from the beam splitter; actuating the actuator connected to the laser transmission unit, wherein the actuator is rotated vertically and horizontally in a predetermined radius via control of a controller and moves the laser transmission unit, thus changing an emission pattern of the diffracted laser beam emitted via the diffracting; and forming the pattern on the surface of the object to be processed with the laser beam rotated vertically and horizontally in the predetermined radius via the actuating.

According to another aspect of the present disclosure, the actuating may include two or more of the following: linearly moving a linear movement member connected to a lower part of the laser transmission unit, wherein the linear movement member moves the laser transmission unit forward and backward in a linear direction; rotating a rotation member connected to a lower part of the linear movement member, wherein the rotation member rotates the linear movement member upward and downward at a set rotation angle; and elevating an elevation member connected to a lower part of the rotation member, wherein the elevation member elevates the rotation member upward and downward.

According to another aspect of the present disclosure, linearly moving the linear movement member may subject the laser transmission unit to undergo linear reciprocal movement along a linear guide, or forms the pattern on a surface of the object to be processed in a state of being moved.

According to another aspect of the present disclosure, rotating the rotation member may rotate the linear movement member at a set angle along a rotation guide, or forms the pattern on the surface of the object to be processed with the laser transmission unit in a state of being rotated.

According to another aspect of the present disclosure, elevating the elevation member may elevate the rotation member vertically along an elevation block guide, or forms the pattern on the surface of the object to be processed with the laser beam of the laser transmission unit in a state of being elevated.

According to another aspect of the present disclosure, the method may include forming a pattern on the surface of the object to be processed with the laser beam of the laser transmission unit through a combination of the linearly moving the linear movement member and the rotating the rotation member.

According to another aspect of the present disclosure, the method may include forming a pattern on the surface of the object to be processed with the laser beam of the laser transmission unit through a combination of the linearly moving the linear movement member and the elevating the elevation member.

According to another aspect of the present disclosure, the method may include forming a pattern on the surface of the object to be processed with the laser beam of the laser transmission unit through a combination of the rotating the rotation movement member and the elevating the elevation member.

According to another aspect of the present disclosure, the method may include forming a pattern on the surface of the object to be processed with the laser beam of the laser transmission unit through a combination of the linearly moving the linear movement member, the rotating the rotation movement member, and the elevating the elevation member.

According to another aspect of the present disclosure, the method may include adjusting a length of laser beam trajectory according to exposure time of the laser beam to the surface of the object to be processed by regulating on/off time of the laser source.

According to another aspect of the present disclosure, the method may include patterning laser beam trajectory into a dot on the surface of the object to be processed by regulating exposure time of the laser beam emitted from the laser source in an on/off fashion.

According to another aspect of the present disclosure, the method may include forming laser beam trajectory on only a part of the surface of the object to be processed by emitting the laser beam to only one of the at least one array.

Advantageous Effects

According to one embodiment of the present disclosure, a surface of a material is capable of being processed with uniformly diffracted laser beams using a laser source having processing quality with precision and improvement, thereby increasing work efficiency and production rate.

Further, according to one embodiment of the present disclosure, processing patterns having various shapes are capable of being implemented on a surface of an object to be processed by converting the direction of a laser transmission unit using an actuator.

Further, according to one embodiment of the present disclosure, laser beams of the laser transmission unit are capable of being diffracted uniformly using a beam splitter and a focusing lens of a diffraction optical system, thereby saving costs of the basic equipment and reducing the unit cost of production, compared to those required for the same workload of the conventional marking equipment.

Further, according to one embodiment of the present disclosure, the number of laser sources that are required for the conventional laser equipment using a laser scanner required for the same workload is capable of being decreased, thereby additionally reducing manpower and costs for maintaining the laser source and the optical system.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure. The scope of the present disclosure will be more clearly understood from the following detailed description taken in conjunction with the accompanying drawings, and thus it will be understood that the present disclosure is not limited to only contents illustrated in the accompanying drawings.

DETAILED DESCRIPTION

Best Mode

Hereinafter, embodiments of the present disclosure will be described in detail referring to the accompanying drawings in order to be implemented easily by those skilled in the art. However, the description of the present disclosure is simply embodiments for structural and functional explanations, thus it should not be interpreted as meaning that the embodiments described herein limit the scope of the present disclosure. That is, the embodiments are capable of being modified and may have various forms, thus it should be understood as meaning that the scope of the present disclosure includes equivalents capable of achieving a technical idea. Further, it should not be understood as meaning that a particular embodiment includes either both of aims and advantageous effects provided in the present disclosure or the effects only.

The terms used in the present disclosure should be understood as the following.

Since the terms, such as "first", "second", etc., are used for distinguish one element from other elements, the scope of the present disclosure should be not limited thereto. For example, "a first element" may be referred to as "a second element", and similarly thereto, "a second element" may be referred to as "a first element". When mentioning that an element is "connected" to the other element, it may be connected directly thereto, however, it should be understood that there may be another element between them. Whereas, when mentioning that an element is "connected directly" to the other element, it should be understood that there may not be any other element between them. Meanwhile, it should also be understood in the same way as the above in the case of the following expressions for explaining the relationship between elements, i.e., "between~" and "directly between~", or "adjacent to~" and "adjacent directly to~".

It should be understood that the singular expression includes the plural expression unless specifically stated otherwise. The terms, such as "comprise", "have", etcetera indicate the existences of the implemented features, numbers, steps, operations, elements, components, or any of combinations thereof. It should be understood that they do not preclude the potential existences or additions of one or more features, numbers, steps, operations, elements, components, or any of combinations thereof.

Unless otherwise defined, all terms used herein have the same meanings as those commonly understood by those having ordinary knowledge in the art to which the present disclosure pertains. It should be understood that the terms defined in commonly used dictionaries, should be interpreted to be consistent with the meanings contextually stated in the field of relevant art and will not be interpreted to have idealized or excessively formalistic senses unless explicitly defined in the present disclosure.

Figure 1:
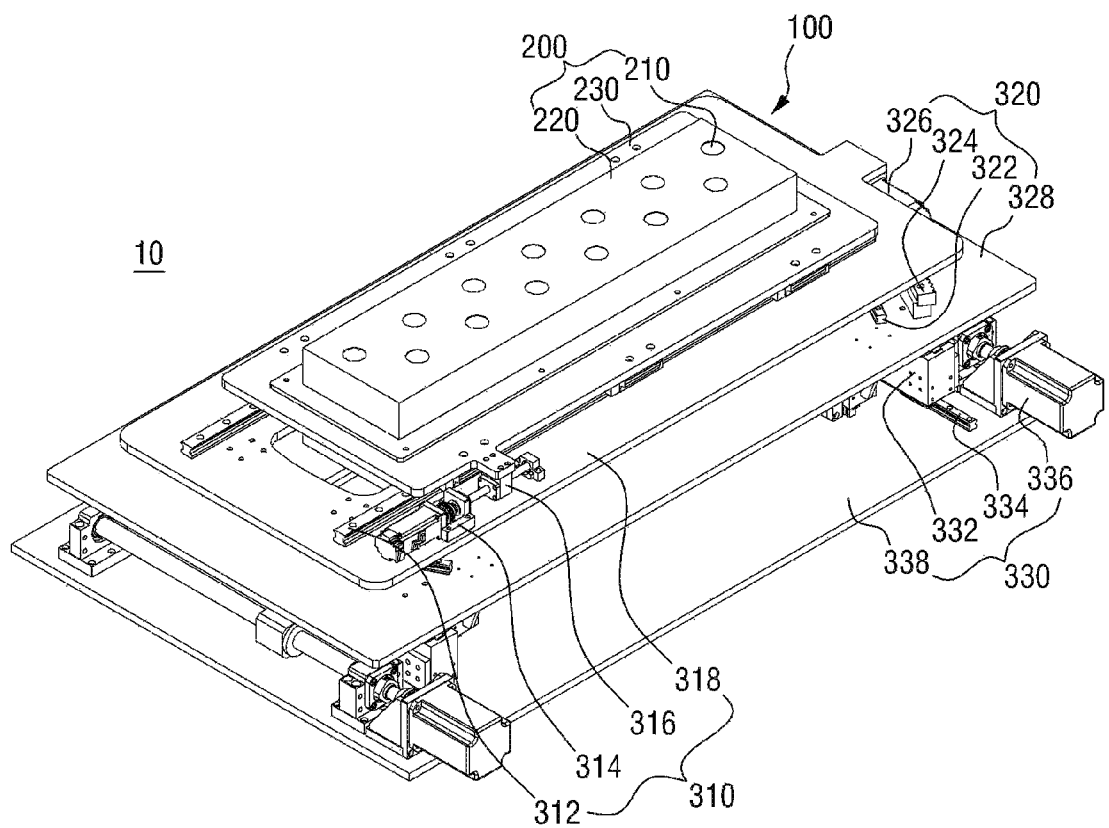
FIG. 1 is a perspective view showing the operation of a diffraction optical system in a processing device for forming a pattern on the surface of a material using diffraction of a laser beam according to one embodiment of the present disclosure.
Figure 2:
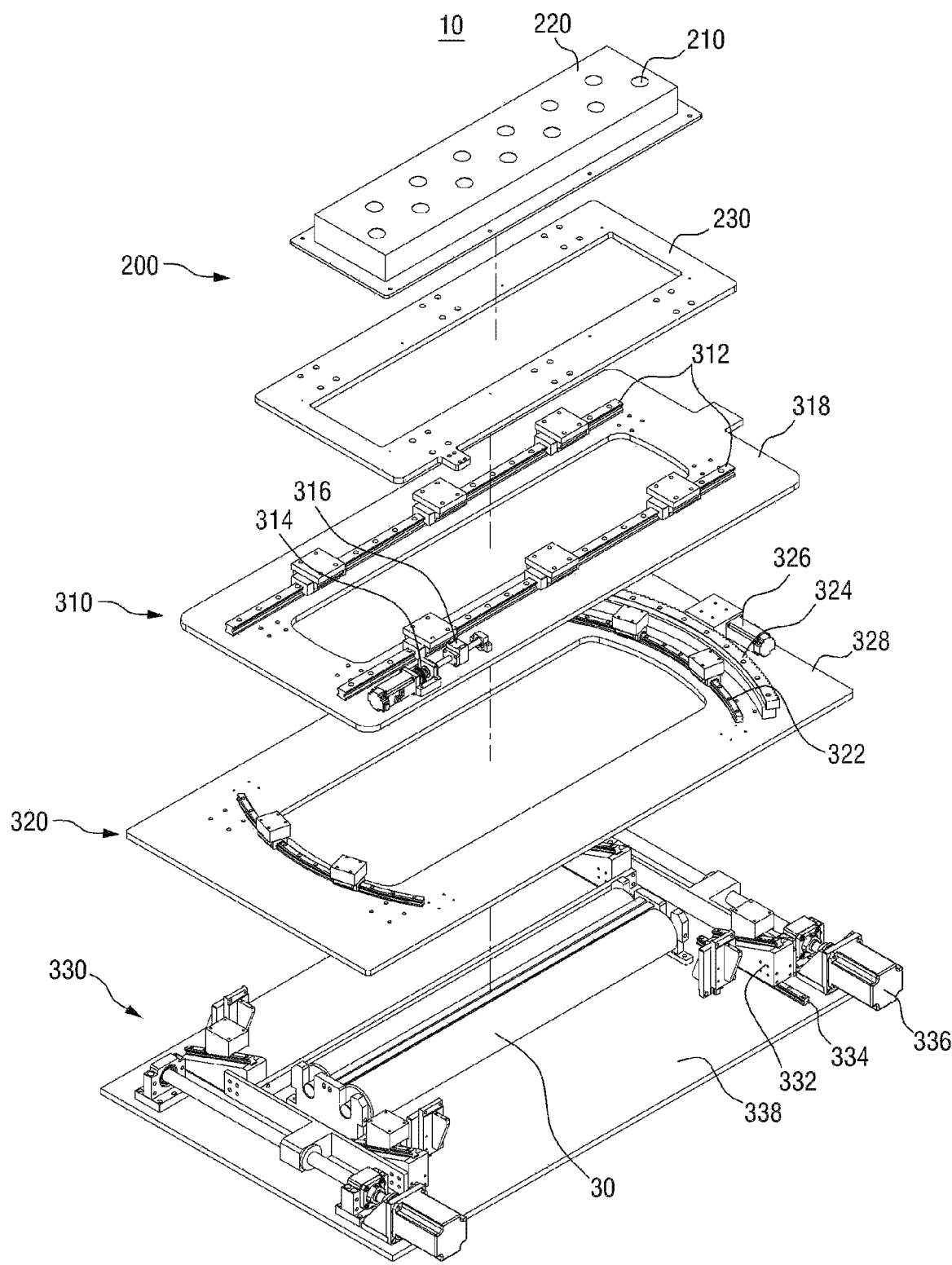
FIG. 2 is an exploded perspective view of the processing device.
Figure 3:
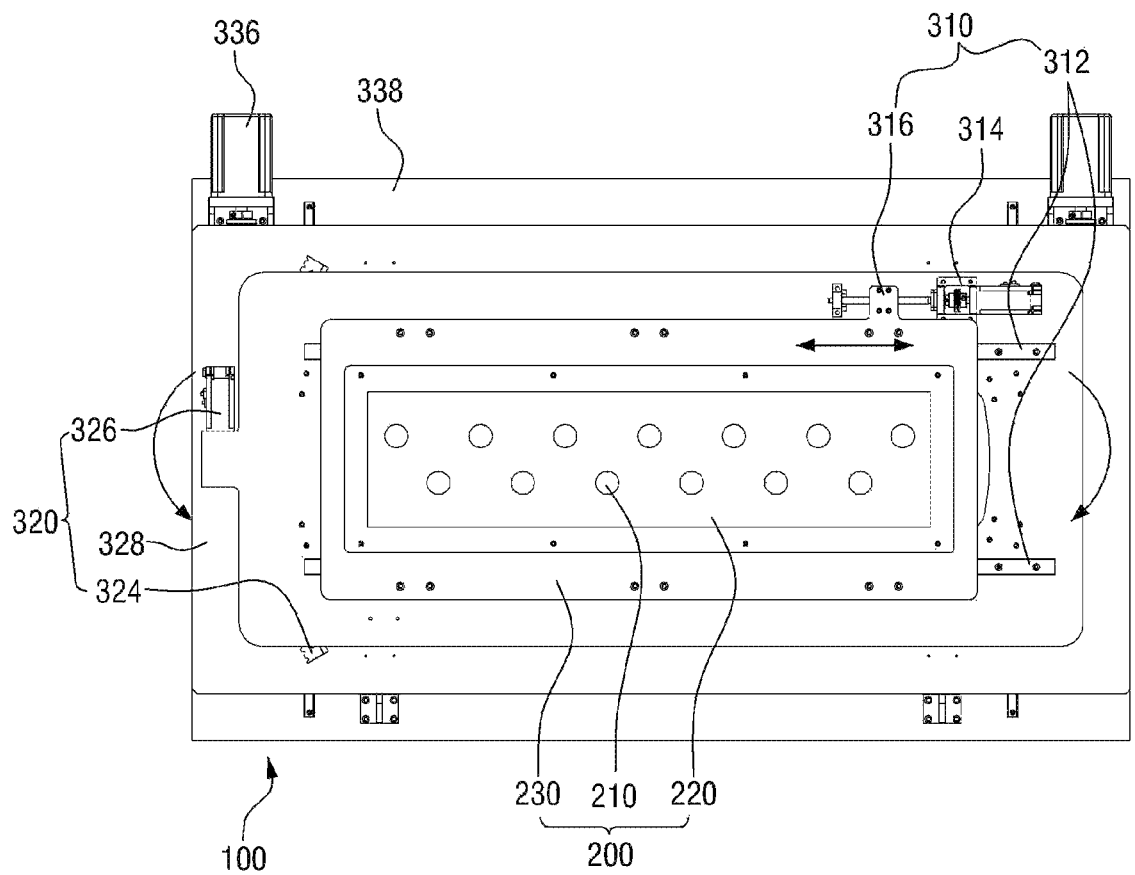
FIG. 3 is a top view of the processing device.
Figure 4:
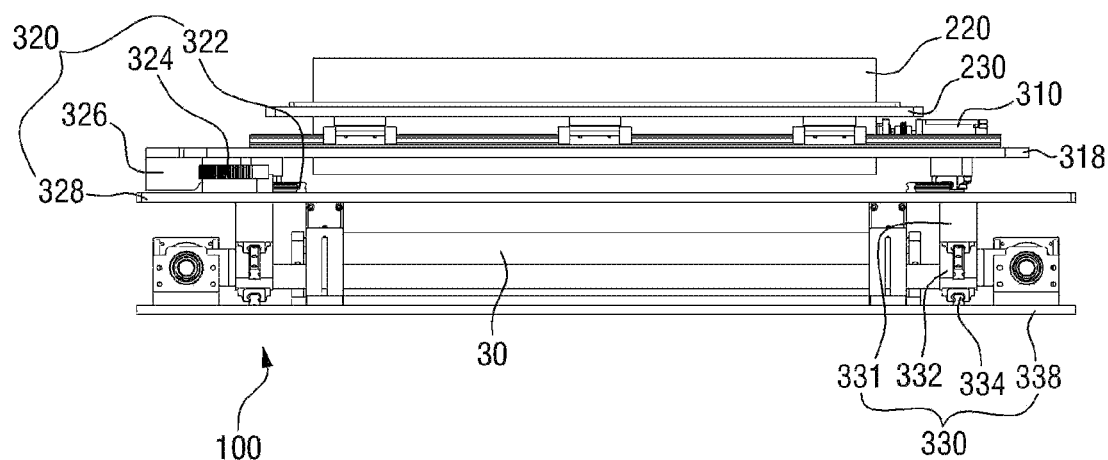
FIG. 4 is a front view of the processing device.
Figure 5:
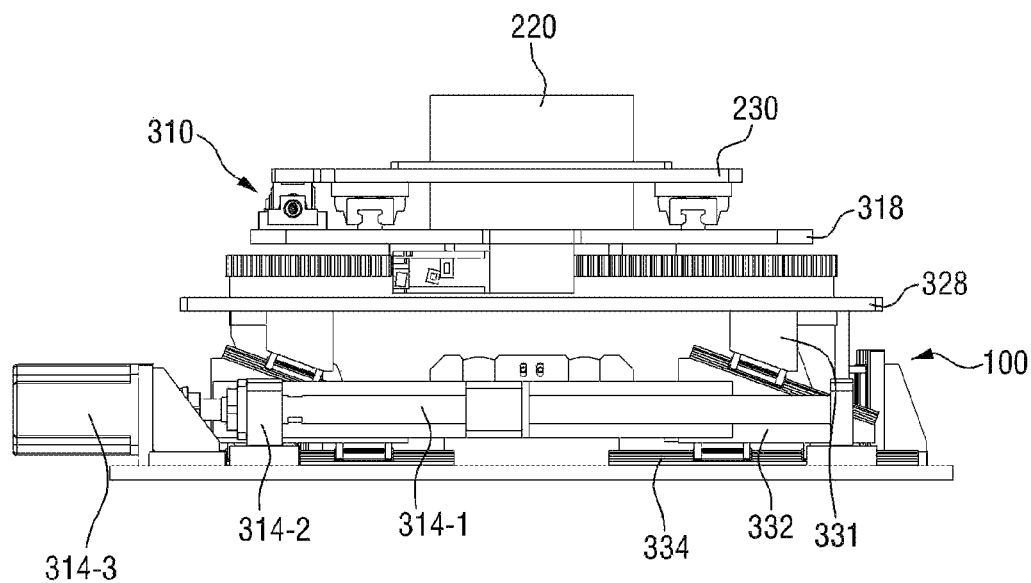
FIG. 5 is a side view of the processing device.
Figure 6:
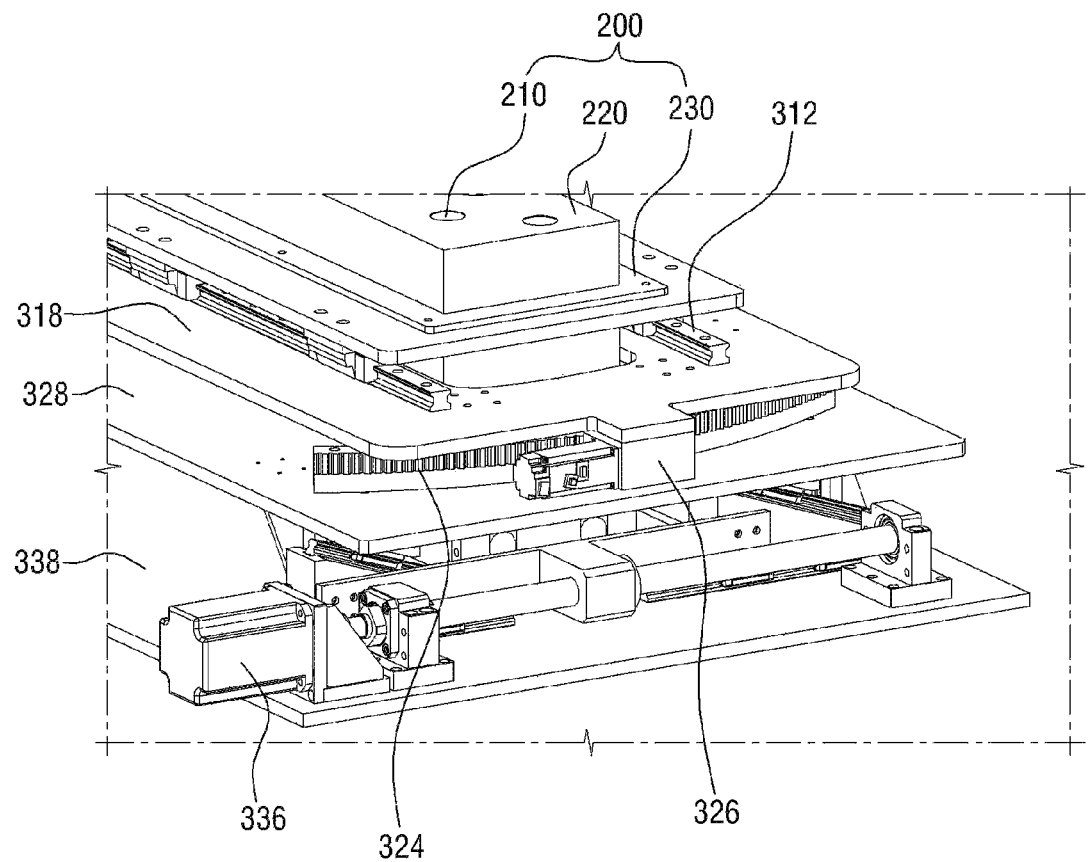
FIG. 6 is a partial detail view of the laser transmission unit and the rotation member.
Figure 7:
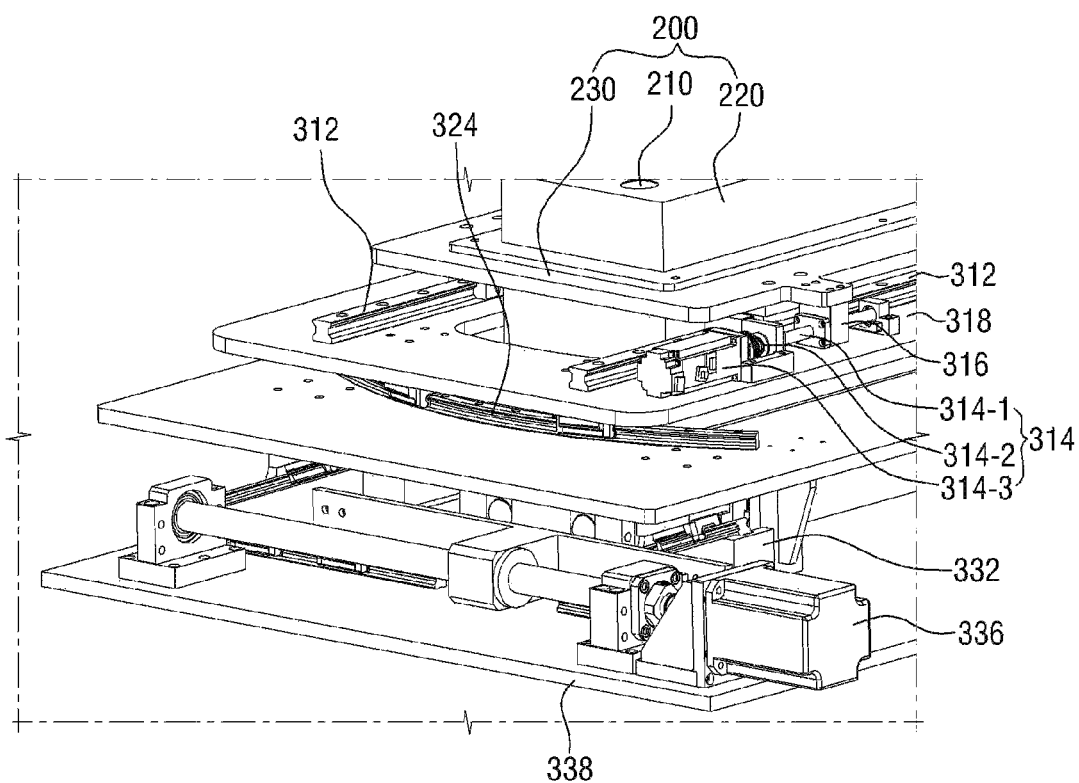
FIG. 7 is a partial detail view of the linear movement member and the rotation member.
Figure 8:
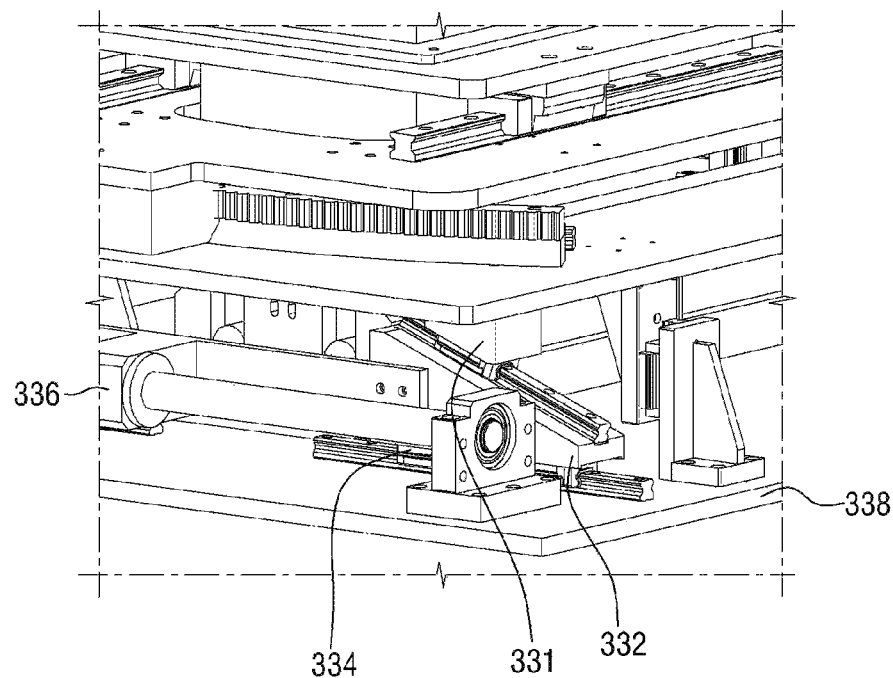
FIG. 8 is a partial detail view of the elevation member.
Figure 9:
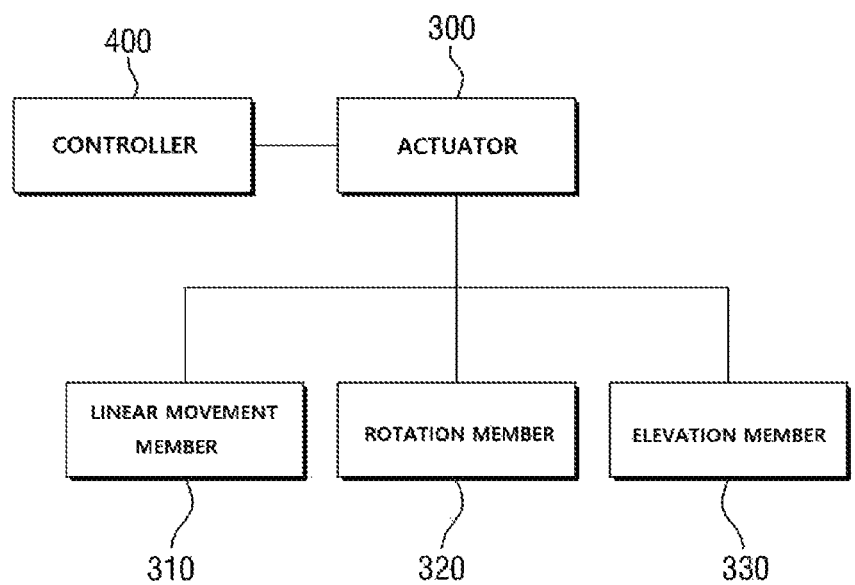
FIG. 9 is a block diagram showing the control of the controller.
Figure 10:
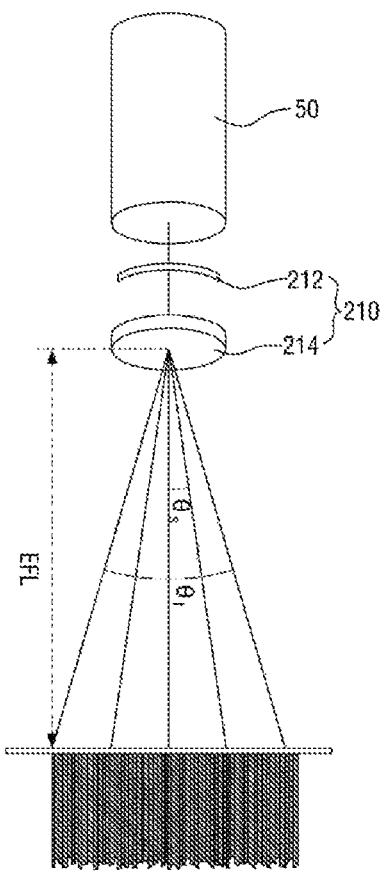
FIG. 10 is a schematic diagram of the diffraction optical system.
Figure 13:
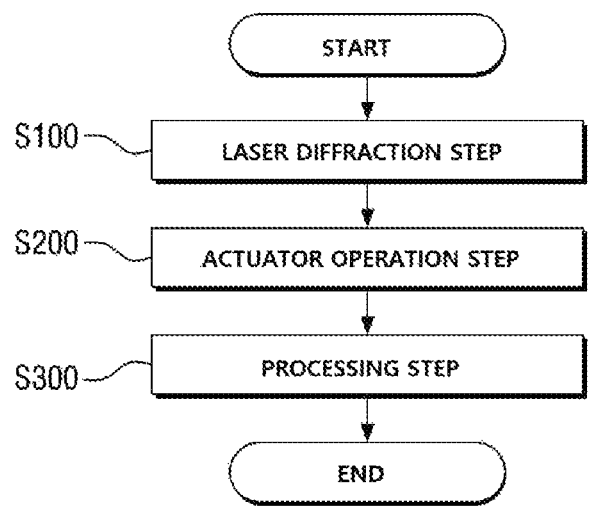
FIG. 13 is a flowchart showing the processing sequence for forming a pattern on the surface of a material using diffraction of a laser beam according to one embodiment of the present disclosure.
Figure 14:
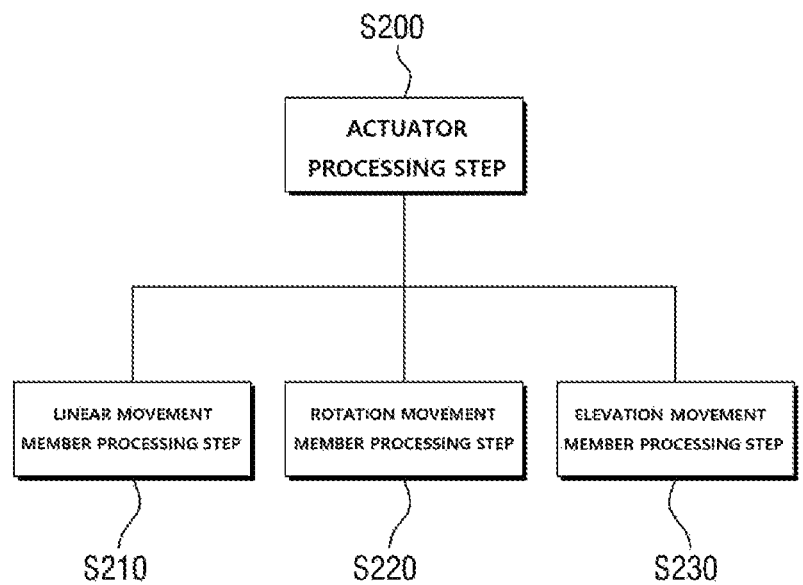
FIG. 14 is a block diagram showing each processing step constituting the actuator operation step.
Figure 15:
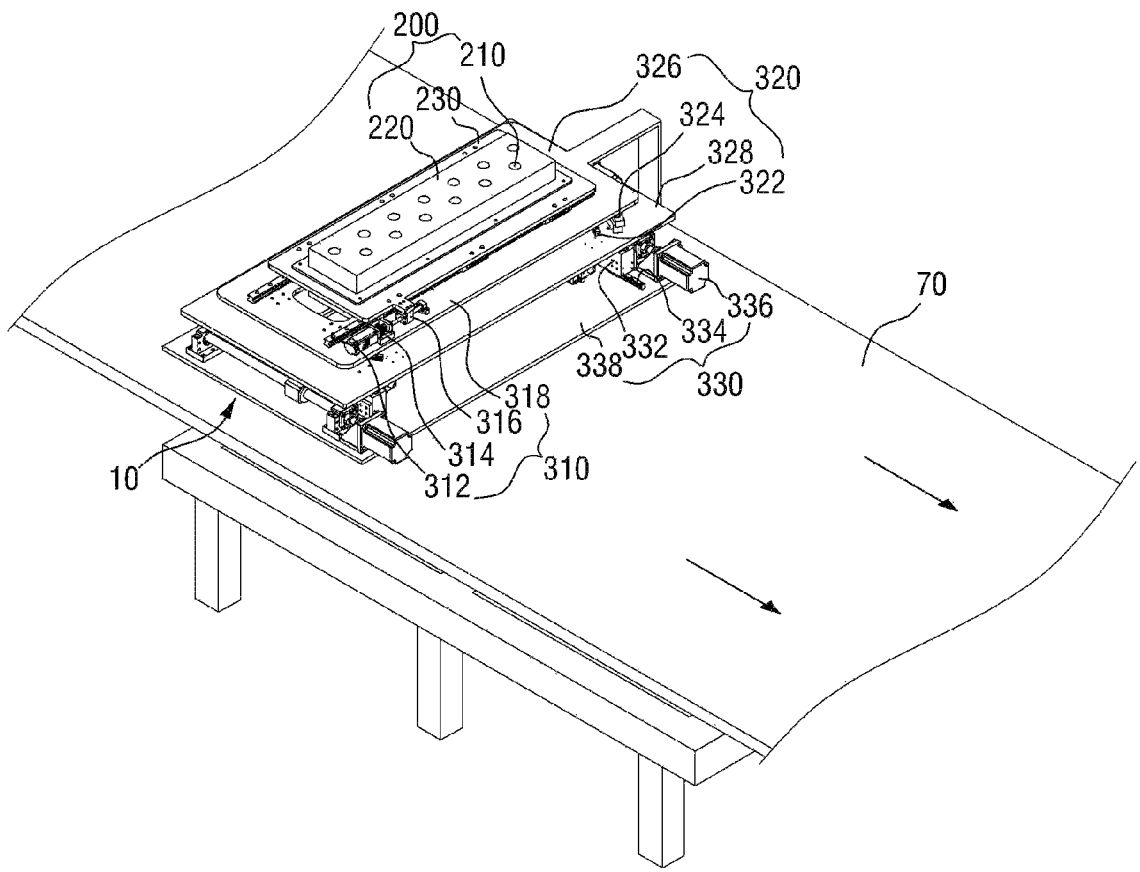
FIG. 15 is a view showing a state of the processing device attached to the transfer rail.
Figure 16:
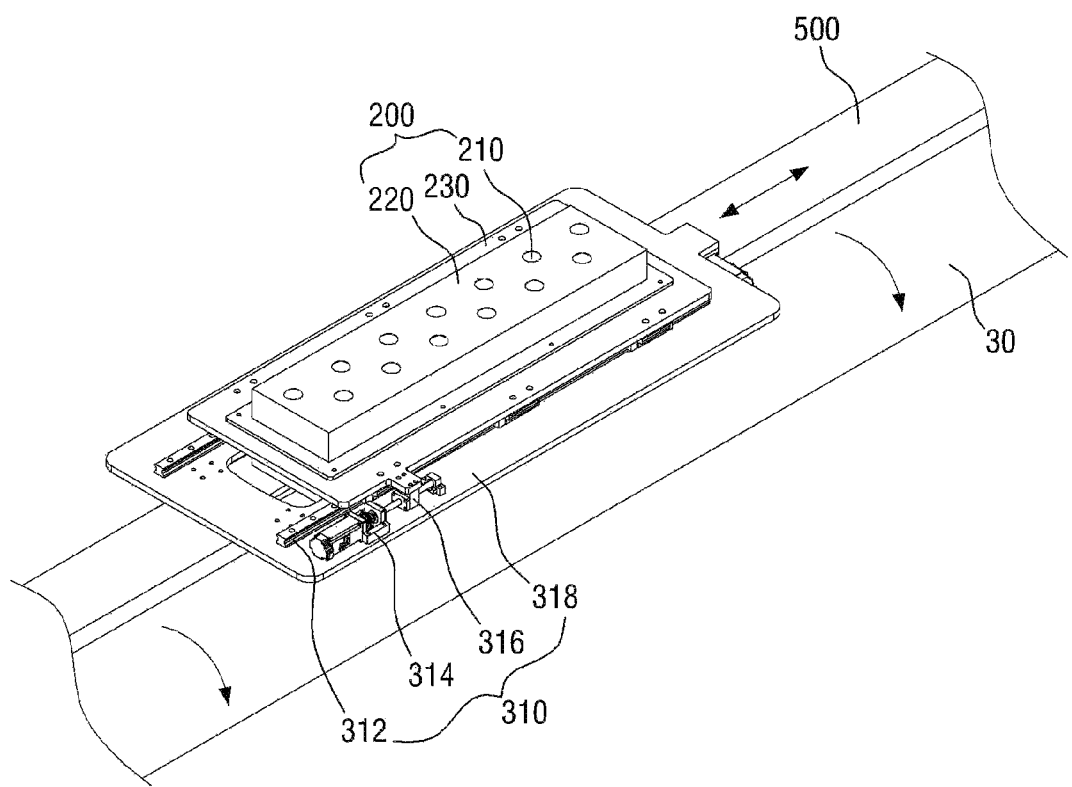
FIG. 16 is a view showing a state of the laser transmission unit attached to the transmission unit guide.

FIG. 1 is a perspective view showing the operation of a diffraction optical system in a processing device for forming a pattern on the surface of a material using diffraction of a laser beam according to one embodiment of the present disclosure. FIG. 2 is an exploded perspective view of the processing device. FIG. 3 is a top view of the processing device. FIG. 4 is a front view of the processing device. FIG. 5 is a side view of the processing device. FIG. 6 is a partial detail view of the laser transmission unit and the rotation member. FIG. 7 is a partial detail view of the linear movement member and the rotation member. FIG. 8 is a partial detail view of the elevation member. FIG. 9 is a block diagram showing the control of the controller. FIG. 10 is a schematic diagram of the diffraction optical system. FIGS. 11A to 11D and FIGS. 12A to 12C are embodiments in which various kinds of patterns are formed on an object to be processed with the processing device. FIG. 13 is a flowchart showing the processing sequence for forming a pattern on the surface of a material using diffraction of a laser beam according to one embodiment of the present disclosure. FIG. 14 is a block diagram showing each processing step constituting the actuator operation step. FIG. 15 is a view showing a state of the processing device attached to the transfer rail. FIG. 16 is a view showing a state of the laser transmission unit attached to the transmission unit guide.

As shown in FIGS. 1 to 10, 15 and 16, a processing device 10 for forming a pattern on the surface of an object to be processed using a laser beam emitted from a laser source may include a device main body 100, a laser transmission unit 200, an actuator 300, and a controller 400.

The device main body 100 may provide a space where the object to be processed is processed using a laser beam emitted from a laser source 50.

The laser transmission unit 200 may constitute a part of the device main body 100 and may irradiate a laser beam toward the object to be processed, while accommodating a laser beam emitted from the laser source 50.

The laser transmission unit 200 may diffract a laser beam, then emitting the diffracted laser beam to the object to be processed.

The laser transmission unit 200 may include a diffraction optical system 210, an array 220, and an array fixture 230.

At least one diffraction optical system 210 may be provided and may diffract a laser beam emitted from the laser source 50.

The diffraction optical system 210 may include a beam splitter 212 and a focusing lens 214.

The beam splitter 212 may reflect a part of the laser beam emitted from the laser source 50 and transmits the rest (i.e., remaining part of the laser beam).

The focusing lens 214 may control diffraction by adjusting a focus, while passing through the laser beam transmitted from the beam splitter 212.

The diffraction optical systems 210 may be installed to cross each other in a zigzag pattern in the arrays forming a pair.

A beam splitter refers to a reflector or other optical device that reflects a part of a light beam and transmits the rest, and is used in an interferometer, etcetera. It may be also acceptable that it is a kind of splitter that obtains two outgoing lights of which oscillation directions are perpendicular to each other, by using birefringence of a crystal.

At least one array 220 may be provided and may have a structure in which a plurality of receiving grooves is formed linearly for accommodating the diffraction optical systems 210.

An upper part of the array fixture 230 may be fixed with the arrays 220, and a lower part of the array fixture 230 may be connected to the actuator 300.

The actuator 300 may constitute a part of the device main body 100 and may be connected to the laser transmission unit 200 so as to change an emission pattern of the laser beam while rotating the laser transmission unit 200 vertically/horizontally or in a set radius.

The actuator 300 may include a linear movement member 310, a rotation member 320, and an elevation member 330.

The linear movement member 310 may be connected to a lower part of the laser transmission unit 200 so as to move the laser transmission unit 200 forward and backward in a linear direction.

The linear movement member 310 may include a linear guide 312, a ball screw 314, a roller block 316, and a linear fixture 318.

The linear guide 312 may be combined with a lower part of the laser transmission unit 200 so as to guide the linear movement of the laser transmission unit 200.

The ball screw 314 may be connected to the linear guide 312 and the laser transmission unit 200 so as to reciprocally move the laser transmission unit 200 forward and backward on the linear guide 312.

The ball screw 314 may include a male screw 314-1, a female screw 314-2, and a ball screw driver 314-3.

One end of the male screw 314-1 may be fixed to the linear fixture 318 and may have a structure in which a male screw thread is formed.

The female screw 314-2 may be provided with balls corresponding to the male screw thread formed in the male screw 314-1, may be connected to the roller block 316, may be combined with the male screw 314-1, and may move the male screw 314 forward and backward.

The ball screw driver 314-3 may be connected with the other end of the male screw 314-1 and may provide the male screw thread 314-1 with a rotation force.

The roller block 316 may be connected to the ball screw 314 and the laser transmission unit 200 and may be movably combined with a rail formed on the linear guide 312.

That is, a wheel that is combined with the rail of the linear guide 312 may be installed in a lower part of the roller block 316, and a plurality of the roller blocks 316 may be installed in parallel at a set interval in a lower part of the array fixture 230. Further, any one of these may be connected to the ball screw 314.

The liner fixture 318 may have a structure in which the linear guide 312 and the ball screw 314 are installed, the rotation member 320 is connected to a lower part, and a through hole through which the laser beam of the laser transmission unit 200 passes is formed.

A ball screw refers to a device that converts rotational motion of an electric motor into a linear motion and is normally composed of a long male screw connected to a motor and a female screw that is a target for the linear motion. When the male screw connected with a rotational moving object rotates, the engaged female screw moves forward and backward according to the rotational motion. In general, a steel ball may be placed in a space where the female screw and the male screw are engaged to reduce the friction force or this is formed into a bearing shape to reduce friction. A ball screw bearing is for such a bearing type, and a motor connected with a male screw is referred to as a ball screw motor.

The rotation member 320 may be connected to a lower part of the linear movement member 310, thus rotating the linear movement member 310 vertically at a set angle.

The rotation member 320 may include a rotation guide 322, a rotation gear 324, a gearbox 326, and a rotation guide fixture 328.

The rotation guide 322 may have an arc-shaped structure that is installed at opposite ends of a lower part of the linear movement member 310 respectively and guide the linear movement member 310.

The rotation gear 324 may have a shape corresponding to the rotation guide 322 and is movably combined with a rail formed on the rotation guide 322 while being connected to a lower part of the linear movement member 310, so as to allow the rotation movement of the linear movement member 310.

That is, the rotation gear 324 may have a wheel that is installed in a part to be combined with the rotation guide 322, thus being movably combined to the rail of the rotation guide 322.

The gearbox 326 may be connected to the rotation gear 324 so as to provide power allowing the movement of the rotation gear 324.

The rotation guide fixture 328 may be a structure in which the rotation guide 322, the rotation gear 324, and gearbox 326 are installed in an upper part, the elevation member 330 is connected to a lower part, and a through hole through which the laser beam of the laser transmission unit 200 passes is formed.

The elevation member 330 may be connected to opposite ends of a lower part of the rotation member 320, thus elevating the rotation member 320 upwardly and downwardly.

The elevation member 330 may include an elevation roller 331, an elevation block 332, an elevation block guide 334, an elevation block driver 336, and an elevation block guide fixture 338.

The elevation roller 331 may be at least one configuration such that a bottom end of the elevation roller 331 is installed to a part of a lower part of the rotation member 320 into a shape being inclined.

The elevation block 332 may have a rail formed into a state that an upper part thereof is inclined in response to the elevation roller 331 and the elevation roller 331 may be movably connected thereto.

That is, a wheel may be installed in a lower part of the elevation roller 331, thus being movably connected to the rail formed on the elevation block 332.

The elevation block guide 334 may be at least one configuration that forms a rail so as to combine a lower part of the elevation block 332, thus allowing a linear movement thereof.

That is, a wheel may be installed in a lower part of the elevation block 332, thus being movably connected to the rail formed on the elevation block guide 334.

The elevation block driver 336 is connected to the elevation block 332, thus providing power allowing movement of the elevation block 332 along the elevation block guide 334.

The elevation block driver 336 may be the ball screw 314 type. The ball screw 314 may include a male screw 314-1 of which one end is fixed to the elevation block guide fixture 338, a female screw 314-2 that has balls corresponding to the male screw thread formed in the male screw 314-1, is combined with the male screw 314-1 and moves the male screw 314-1 forward and backward, and a ball screw driver 314-3 that is connected to the other end of the male screw 314-1, thus providing power allowing movement of the elevation block 332.

The elevation block driver 336 may provide power allowing movement of the elevation block 332 in a linear motor fashion, besides the ball screw 314 type.

The elevation block guide fixture 338 may be installed with the elevation block guide 334 and the elevation block driver 336, and may have a roller 30 that transfers the object to be processed.

Particularly, the elevation roller 331, the elevation block 332, and the elevation block guide 334 may form a group, and may be connected to the elevation block driver 336 respectively in a state that each thereof maintain incline directions to be the same by two at a set interval.

Further, a first set of the elevation roller 331, elevation block 332, the elevation block guide 334, and the elevation block driver 336 combined with each other, and a second set identical to the first set, may be installed facing each other at opposite ends of the elevation block guide fixture 338, along a longitudinal direction of the linear guide 312.

The controller 400 may be installed in a part of the device main body 100 and connected to the actuator 300, thus controlling the operation of the actuator 300.

The processing device 100 of the present disclosure may have a through hole through which the laser beam of the laser transmission unit 200 passes formed on the elevation block guide fixture 338. Longitudinal one end of the elevation block guide fixture 338 may be detachably connected to a part of an upper part of a transfer rail 70 on which the object to be processed is transferred.

Particularly, one end of the elevation block guide fixture 338 may be detachably connected to the transfer rail 70 using a bolt and a nut. Patterns may be formed on the surface of the object to be processed uniformly by allowing the elevation block guide fixture 338 to undergo linear reciprocal movement along a longitudinal direction, i.e., being perpendicular to a transfer direction of the transfer rail 70 (transfer direction extending along arrows shown in the transfer rail).

Further, the processing device may further include a transmission unit guide 500 that is combined to the laser transmission unit 200, is installed in an upper part of the roller 30 along with a longitudinal direction of the roller 30 so as to emit a laser beam and provides power thus guiding the linear movement of the laser transmission unit 200.

That is, the surface of the roller 30 is etched with the laser transmission unit 200 and patterns may be formed on the surface of the object to be processed while transferring the object to be processed by the etched roller 300.

The processing device 10 of the present disclosure may have wireless communication modules, such as a Wi-Fi communication module, Bluetooth communication module, and ZigBee communication module, to be connected to the controller 400, thus controlling operation or exchanging information wirelessly with external terminal devices.

Further, according to the present disclosure, a camera and a display to be connected to the controller 400 may be installed in a part of the device main body 100, thus imaging and outputting a laser beam trajectory pattern to be emitted to the object to be processed, in real time.

According to a method of forming a pattern on the surface of a material by diffraction of laser beam using the aforesaid processing device 10, the processing method of forming a pattern on the surface of an object to be processed using a laser beam emitted from the laser source 50 with the processing device comprising the laser transmission unit 200 comprising at least one diffraction optical system 210 that diffracts the laser beam emitted from the laser source 50, at least one array 220 in which a plurality of receiving grooves for accommodating the diffraction optical system(s) 210 is formed linearly, and the array fixture 230 of which an upper part is fixed with the array(s) 220 may include laser diffraction step S100, actuator operation step S200, and processing step S300, as shown in FIG. 11A to FIG. 14.

In the laser diffraction step S100, the beam splitter 212 reflects a part of the laser beam emitted from the laser source 50 and transmits the rest of the laser beam, and the laser transmission unit 200, having the diffraction optical system 210 that controls a focus while passing the laser beam through a focusing lens, diffracts and emits the laser beam.

In the actuator operation step S200, an actuator 300 is connected to the laser transmission unit 200, is rotated vertically and horizontally in a predetermined radius by the control of the controller 400 and moves the laser transmission unit 200 thus changing an emission pattern of the laser beam diffracted in the laser diffraction step S100.

Figure 11A:
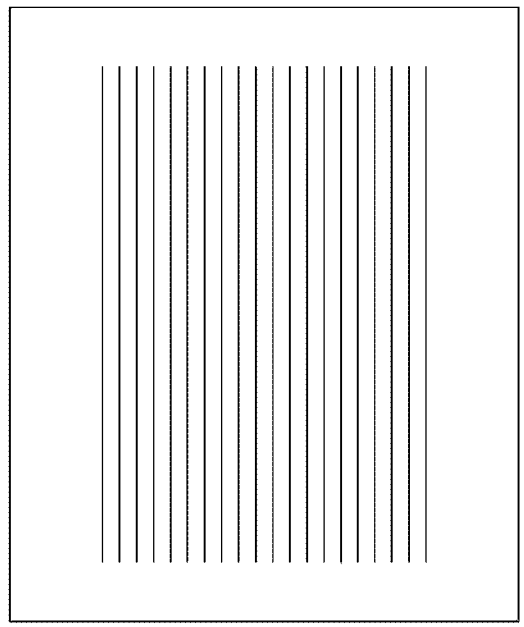
FIGS. 11A to 11D and FIGS. 12A to 12C are embodiments in which various kinds of patterns are formed on an object to be processed with the processing device.

In the processing step S300, a pattern is formed on the surface of the object to be processed with the laser beam rotated vertically and horizontally in the predetermined radius through the actuator operation step S200 (FIG. 11A).

The actuator operation step S200 may include linear movement member processing step S210, rotation movement member processing step S220, and elevation movement member processing step S310.

In the linear movement member processing step S210, the linear movement member 310 is connected to a lower part of the laser transmission unit 200 and moves the laser transmission unit 200 forward and backward in a linear direction.

In the linear movement member processing step S210, the laser transmission unit 200 undergoes reciprocal movement linearly along with the linear guide 312, or a pattern may be formed on the surface of the object to be processed in a state that the laser transmission unit 200 has been moved.

Figure 11B:
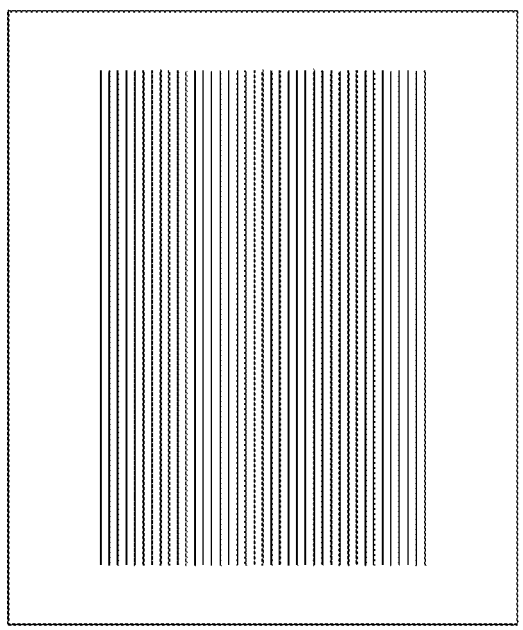
Figure 11C:
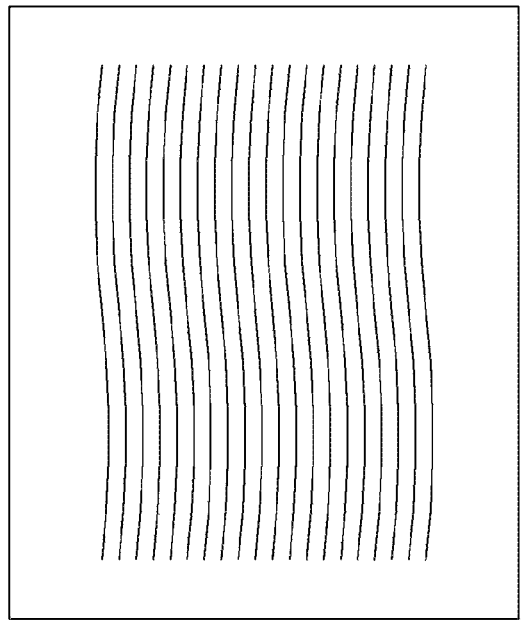

That is, patterns of the laser beam trajectory may be changed into a wave shape while moving the laser transmission unit 200 horizontally using the linear movement member 310 (FIG. 11C).

In the rotation movement member processing step S220, the rotation member 320 is connected to a lower part of the linear movement member 310 and rotates the linear movement member 310 upward and downward at a set rotation angle.

In the rotation movement member processing step S220, the linear movement member 310 undergoes rotation at a set angle along with the rotation guide 322 or a pattern may be formed on the surface of the object to be processed with the laser beam of the laser transmission unit 200 in a state that the linear movement member has been moved.

That is, patterns of the laser beam trajectory may be formed densely in a certain part of the object to be processed and sparsely in the other parts, while adjusting the rotation angle of the laser transmission unit 200 using the rotation member 320 (FIG. 11B).

In the elevation movement member processing step S230, the rotation member 320 is elevated upward and downward along with the elevation block guide 334, or patterns may be formed on the surface of the object to be processed with the laser beam transmission unit 200 in a state that the rotation member has been elevated.

Figure 11D:
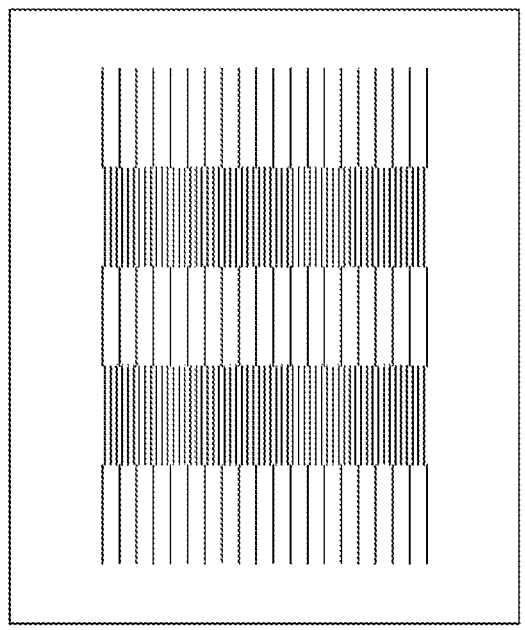

That is, thickness and depth of patterns formed on the surface of the object to be processed may be adjusted by focusing in or focusing out the laser beam, while elevating the laser transmission unit 200 upward and downward using the elevation member 330 (FIG. 11D).

Hereinafter, other embodiments of the processing method according to the present disclosure will be described with reference to FIGS. 12A to 12C.

Patterns may be formed on the surface of the object to be processed with the laser beam of the laser transmission unit 200 through a combination of the linear movement member processing step S210 and the elevation member operation step S220.

Patterns may be formed on the surface of the object to be processed with the laser beam of the laser transmission unit 200 through a combination of the rotation movement member processing step S220 and the elevation movement member processing step S230.

Patterns may be formed on the surface of the object to be processed with the laser beam of the laser transmission unit 200 through a combination of the linear movement member processing step S210, the rotation movement member processing step S220, and the elevation movement member processing step S230.

Figure 12A:
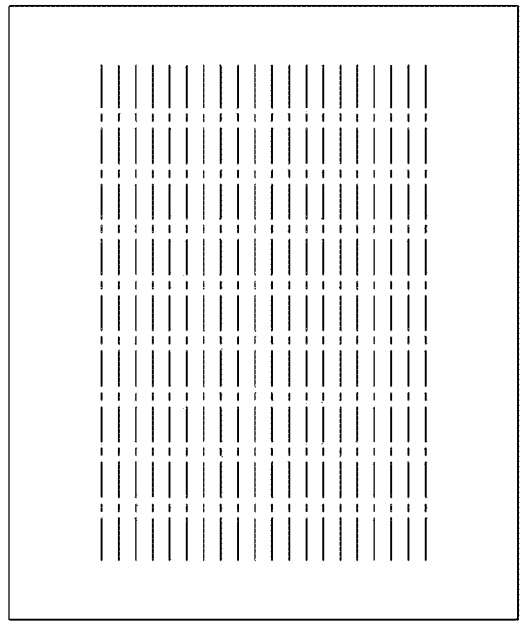

A length of the of laser beam trajectory may be adjusted according to the exposure time of the laser beam to the surface of the object to be processed by regulating on/off time of the laser source 50 (FIG. 12A).

The laser beam trajectory may be patterned into a dot on the surface of the object to be processed by regulating the exposure time of the laser beam emitted from the laser source 50 to an extremely short interval of seconds or less in an on/off fashion.

Figure 12B:
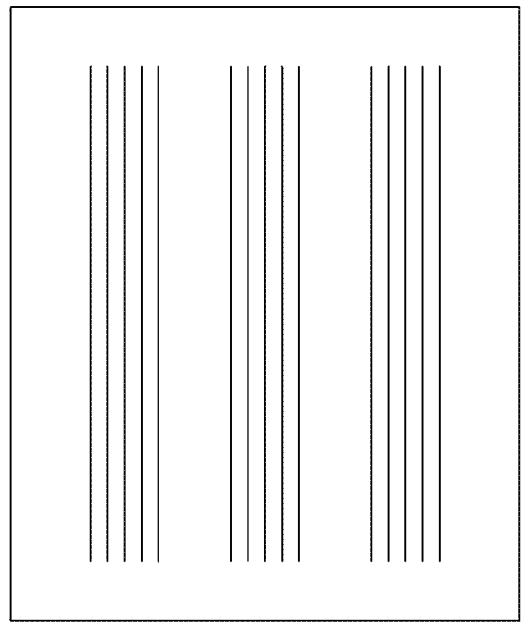

The laser beam trajectory may be formed on only a part of the surface of the object to be processed by emitting the laser beam to only one of the arrays 200 (FIG. 12B).

The processing method of the present disclosure is not limited to the aforementioned embodiments and thus various types of embodiments are allowable.

Figure 12C:
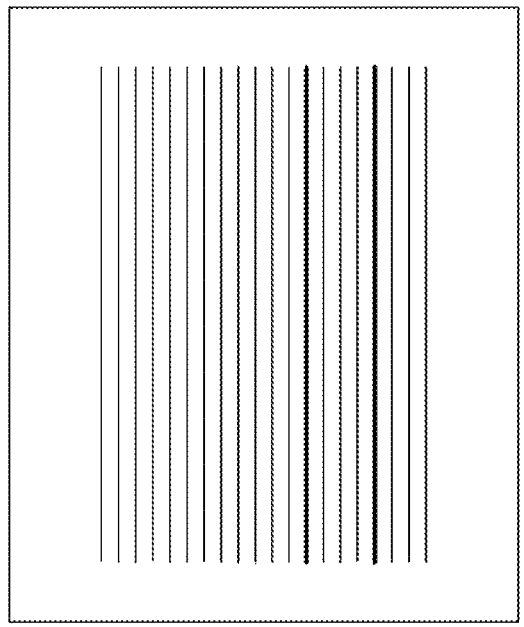

Further, according to the present disclosure, the laser beam trajectory may be concentrated or changed by differently fabricating the curvature of the focusing lens 214 and adjusting the curve of the laser beam (FIG. 12C).

As mentioned above, the detailed description for the disclosed preferable embodiments of the present disclosure was provided in order to be easily implemented by those skilled in the art. While the preferable embodiments of the present disclosure were explained with reference to the accompanying drawings, it will be apparent for those skilled in the art that various changes and modification are allowable within the scope of the present disclosure. For example, those skilled in the art are able to use the respective configurations described in the aforementioned embodiments in different ways of combining the same with each other. Thus, the present disclosure is not limited to the embodiments shown in this application, but rather has the widest scope coinciding with principals and novel features disclosed herein.

The present disclosure may be implemented in different specific forms within the scope of the essential features. Thus, the above detailed description should not be understood limitedly in all aspects but rather should be considered as examples. The scope of the present disclosure should be determined by interpreting accompanying claims rationally, and includes all modifications within the equivalent scope of the present disclosure. Further, the present disclosure may include embodiments by combining claims which are not in explicit relationship in the patent scope, or may include new claims through amendments following filing this application.

FIGURE REFERENCE NUMBERS

10: processing device
30: roller
50: laser source
70: transfer rail
100: device main body
200: laser transmission unit
210: diffraction optical system
212: beam splitter
214: focusing lens
220: array
230: array fixture
300: actuator
310: linear movement member
312: linear guide
314: ball screw
314-1: male screw
314-2: female screw
314-3: ball screw driver
316: roller block
318: linear fixture
320: rotation member
324: rotation gear
326: gearbox
328: rotation fixture
330: elevation member
331: elevation roller
332: elevation block
334: elevation block driver
338: elevation block guide fixture
400: controller
500: transmission unit guide

INDUSTRIAL APPLICABILITY

A processing device for forming a pattern on the surface of a material by using diffraction of a laser beam and a method therefor are capable of processing a surface of a material with uniformly diffracted laser beams using a laser source having processing quality with precision and improvement, thereby increasing work efficiency and production rate. Further, these are capable of implementing processing patterns having various shapes on a surface of an object to be processed by converting the direction of a laser transmission unit using an actuator. Those are also capable of diffracting laser beams of the laser transmission unit uniformly using a beam splitter and a focusing lens of a diffraction optical system, thereby saving costs of the basic equipment and reducing the unit cost of production, compared to those required for the same workload of the conventional marking equipment. Accordingly, the present disclosure has industrial applicability.

The invention claimed is:

1. A processing device to form a pattern on a surface of an object to be processed using diffraction of a laser beam emitted from a laser source, the device comprising:
   a device main body providing a space to process the object to be processed by using the laser beam emitted from the laser source;
   a laser transmission unit formed at a first portion of the device main body, and configured to diffract the laser beam emitted from the laser source so that a diffracted laser beam is emitted toward the object to be processed while accommodating the laser beam emitted from the laser source;
   an actuator formed at a second portion of the device main body and connected to the laser transmission unit so as to change an emission pattern of the diffracted laser beam while moving the laser transmission unit vertically, moving the laser transmission unit horizontally, or rotating the laser transmission unit in a set radius, wherein the actuator comprises a linear movement member connected to a lower part of the laser transmission unit so as to move the laser transmission unit forward and backward in a linear direction, a rotation member combined with a lower part of the linear movement member so as to rotate the linear movement member horizontally at a set angle, and an elevation member combined with opposite ends of the rotation member so as to raise and lower the rotation member upwardly and downwardly; and a controller installed at a third portion of the device main body and connected to the actuator so as to control an operation of the actuator.

2. The processing device to form the pattern on the surface of the object to be processed using diffraction of the laser beam according to claim 1, wherein the laser transmission unit comprises:

at least one diffraction optical system that diffracts the laser beam emitted from the laser source;

at least one array in which a plurality of receiving grooves is formed linearly to accommodate the at least one diffraction optical system; and an array fixture having an upper part and a lower part, wherein the upper part is fixed with the at least one array and the lower part is connected to the actuator.

3. The processing device to form the pattern on the surface of the object to be processed using diffraction of the laser beam according to claim 2, wherein the at least one diffraction optical system comprises:

a beam splitter configured to reflect a part of the laser beam emitted from the laser source and to transmit a remaining part of the laser beam emitted from the laser source; and a focusing lens configured to control diffraction of the diffracted laser beam by adjusting focus while passing through the remaining part of the laser beam transmitted from the beam splitter.

4. The processing device to form the pattern on the surface of the object to be processed using diffraction of the laser beam according to claim 3, further comprising a plurality of diffraction optical systems and a plurality of arrays, wherein the diffraction optical systems are installed in the arrays to cross each other in a zigzag pattern forming a pair.

5. The processing device to form the pattern on the surface of the object to be processed using diffraction of the laser beam according to claim 1, wherein the linear movement member comprises:

a linear guide combined with a lower part of the laser transmission unit so as to guide the linear movement of the laser transmission unit;

a ball screw connected to the linear guide and the laser transmission unit so as to reciprocally move the laser transmission unit forward and backward on the linear guide;

a roller block connected to the ball screw and the laser transmission unit, the roller block movably combined with a rail formed on the linear guide; and a linear fixture in which the linear guide and the linear ball screw are installed, the rotation member is combined to a lower part thereof and a through hole is formed through which the diffracted laser beam of the laser transmission unit passes.

6. The processing device to form the pattern on the surface of the object to be processed using diffraction of the laser beam according to claim 5, wherein the ball screw comprises:

a male screw of which one end is fixed to the linear fixture and in which a male screw thread is formed;

a female screw provided with balls corresponding to the male screw thread formed in the male screw, wherein the female screw is connected to the roller block, combined with the male screw, and configured to move the male screw forward and backward; and a ball screw driver connected with another end of the male screw and configured to provide the male screw with a rotation force.

7. The processing device to form the pattern on the surface of the object to be processed using diffraction of the laser beam according to claim 1, wherein the rotation member comprises:

an arc-shaped rotation guide installed at opposite ends of a lower part of the linear movement member, respectively so as to guide rotation of the linear movement member;

a rotation gear having a shape corresponding to the rotation guide and movably combined with a rail formed on the rotation guide, while being connected to a lower part of the linear movement member, so as to allow the rotation of the linear movement member;

a gearbox connected to the rotation gear so as to provide power allowing movement of the rotation gear; and a rotation guide fixture having an upper part and a lower part, wherein the arc-shaped rotation guide, the rotation gear, and the gearbox are installed in the upper part, the elevation member is combined to the lower part, and a through hole is formed through which the diffracted laser beam of the laser transmission unit passes.

8. The processing device to form the pattern on the surface of the object to be processed using diffraction of the laser beam according to claim 1, wherein the elevation member comprises:

at least one elevation roller installed to a part of a lower part of the rotation member, and that is installed into a shape that a bottom end thereof is inclined;

an elevation block in which a rail is formed into a state that an upper part thereof is inclined in response to the elevation roller, and the elevation roller is movably connected thereto;

at least one elevation block guide in which a rail is formed so as to combine a lower part of the elevation block allowing a linear movement thereof;

an elevation block driver connected to the elevation block and configured to provide power allowing movement of the elevation block along the elevation block guide; and an elevation block guide fixture in which the elevation block guide and the elevation block driver are installed and a roller is provided so as to allow transmission to the object to be processed.

9. The processing device to form the pattern on the surface of the object to be processed using diffraction of the laser beam according to claim 8, wherein the elevation block driver is a ball screw type or a linear motor driving type, and when the elevation block driver is the ball screw type, the elevation block driver includes a male screw of which one end is fixed to the elevation block guide fixture and on which a male screw thread is formed, a female screw has balls corresponding to the male screw thread formed in the male screw, wherein the female screw is connected to the elevation block, combined with the male screw, and configured to move the male screw forward and backward, and a ball screw driver that is connected to another end of the male screw, thus providing power allowing movement of the elevation block.

10. The processing device to form the pattern on the surface of the object to be processed using diffraction of the laser beam according to claim 8, wherein a through hole through which the laser beam of the laser transmission unit passes is formed on the elevation block guide fixture, and a longitudinal one end of the elevation block guide fixture is connected detachably to a part of an upper part of a transfer rail by which the object to be processed is transferred.

11. The processing device to form the pattern on the surface of the object to be processed using diffraction of the laser beam according to claim 1, further comprising a transmission unit guide connected to the laser transmission unit and installed in an upper part of a roller of the elevation member along a longitudinal direction of the roller, the transmission unit guide allowing emission of the diffracted laser beam to the longitudinal direction of the roller and guiding linear movement of the laser transmission unit.

\* \* \* \* \*